United States Patent
Song

(10) Patent No.: US 10,075,703 B2
(45) Date of Patent: Sep. 11, 2018

(54) WIDE-ANGLE AUTOSTEREOSCOPIC THREE-DIMENSIONAL (3D) IMAGE DISPLAY METHOD AND DEVICE

(71) Applicant: SUPERD TECHNOLOGY CO., LTD., Shenzhen (CN)

(72) Inventor: Lei Song, Shenzhen (CN)

(73) Assignee: SUPERD TECHNOLOGY CO., LTD., Shenzhen (CN)

(*) Notice: Subject to any disclaimer, the term of this patent is extended or adjusted under 35 U.S.C. 154(b) by 404 days.

(21) Appl. No.: 14/810,586

(22) Filed: Jul. 28, 2015

(65) Prior Publication Data

US 2016/0191906 A1   Jun. 30, 2016

(30) Foreign Application Priority Data

Dec. 31, 2014   (CN) .......................... 2014 1 0854669

(51) Int. Cl.
*H04N 13/04* (2006.01)
*H04N 13/31* (2018.01)
(Continued)

(52) U.S. Cl.
CPC ......... *H04N 13/31* (2018.05); *H04N 13/0404* (2013.01); *H04N 13/0409* (2013.01);
(Continued)

(58) Field of Classification Search
CPC ........... H04N 13/0404; H04N 13/0409; H04N 13/0415; H04N 13/0422; H04N 13/0425;
(Continued)

(56) References Cited

U.S. PATENT DOCUMENTS 5,777,787 A * 7/1998 Luder ................ G02B 27/2214
                                                          348/E13.022
2006/0082520 A1* 4/2006 Otte .................... G02B 27/2214
                                                          345/32
(Continued)

FOREIGN PATENT DOCUMENTS

CN    102447929 A    5/2012
CN    102510505 A    6/2012
(Continued)

OTHER PUBLICATIONS

European Patent Office (EPO) Search Report for 15195449.2 dated May 10, 2016.
(Continued)

*Primary Examiner* — Deirdre Beasley
(74) *Attorney, Agent, or Firm* — Anova Law Group, PLLC

(57) ABSTRACT

A wide-angle autostereoscopic three-dimensional (3D) image display method is provided. The method includes tracking a user in an autostereoscopic 3D image viewing state with respect to a display panel including a plurality of display units, obtaining a first distance between the display panel and a spectroscopic unit array including a plurality of spectroscopic units and a first width associated with each spectroscopic unit, and determining a second distance between a viewing position of the user and the display panel. The method also includes determining a width of a display unit combination corresponding to the second distance. Further, the method includes calculating a gray value of each display unit based on the width of the display unit combination and a reference value of the distance between each display unit and an edge of the display unit combination and displaying the 3D image on the display panel.

20 Claims, 4 Drawing Sheets

(51) Int. Cl.
*H04N 13/324* (2018.01)
*H04N 13/327* (2018.01)
*H04N 13/366* (2018.01)
*H04N 13/398* (2018.01)

(52) U.S. Cl.
CPC ..... *H04N 13/0415* (2013.01); *H04N 13/0422* (2013.01); *H04N 13/0425* (2013.01); *H04N 13/0468* (2013.01); *H04N 13/0475* (2013.01); *H04N 13/0477* (2013.01); *H04N 13/0497* (2013.01); *H04N 13/324* (2018.05); *H04N 13/327* (2018.05); *H04N 13/366* (2018.05); *H04N 13/398* (2018.05)

(58) Field of Classification Search
CPC ........... H04N 13/0468; H04N 13/0475; H04N 13/0477; H04N 13/0497
USPC .......................................................... 348/51
See application file for complete search history.

(56) References Cited

U.S. PATENT DOCUMENTS

| | | | | |
|---|---|---|---|---|
| 2013/0088486 A1* | 4/2013 | Yoon | .................. | G02B 27/2214 345/419 |
| 2013/0321493 A1* | 12/2013 | Sone | .................... | G02B 27/225 345/690 |
| 2014/0232837 A1* | 8/2014 | Kim | .................... | H04N 13/0409 348/59 |
| 2015/0029317 A1* | 1/2015 | Kim | .................... | G02B 27/2214 348/59 |
| 2015/0077667 A1* | 3/2015 | Lee | .................... | G02B 27/2214 349/15 |

FOREIGN PATENT DOCUMENTS

| | | |
|---|---|---|
| CN | 102707448 A | 10/2012 |
| CN | 103002307 A | 2/2013 |
| CN | 103813153 A | 5/2014 |
| CN | 102572483 B | 8/2014 |
| EP | 2753086 A2 | 7/2014 |
| WO | 2009095862 A1 | 8/2009 |
| WO | 2012131887 A1 | 10/2012 |
| WO | 2013073007 A1 | 5/2013 |
| WO | 2013073028 A1 | 5/2013 |

OTHER PUBLICATIONS

The State Intellectual Property Office of the People's Republic of China (SIPO) Office Action 1 for 201410854669.7 dated Mar. 8, 2016.

* cited by examiner

US 10,075,703 B2

WIDE-ANGLE AUTOSTEREOSCOPIC THREE-DIMENSIONAL (3D) IMAGE DISPLAY METHOD AND DEVICE

CROSS-REFERENCES TO RELATED APPLICATIONS

This application claims priority of Chinese Application No. 201410854669.7 filed on Dec. 31, 2014, the entire contents of which are hereby incorporated by reference.

FIELD OF THE INVENTION

The present disclosure generally relates to the field of stereoscopic display technologies and, more particularly, relates to wide-angle autostereoscopic three-dimensional (3D) image display methods and display devices.

BACKGROUND

A user perceives depth of an object through subtle differences of the object observed by the user's right eye and the user's left eye, thus recognizing a three-dimensional (3D) image. Such difference is called a parallax. Parallax is a displacement or difference in the apparent position of an object viewed along two different lines of sight, and can be measured by the angle or semi-angle of inclination between those two lines. 3D display technology is the technology that generates a certain parallax for the user's left eye and the user's right eye, such that two images having parallax are sent to the user's left eye and the user's right, respectively. After the brain acquires the different images viewed by the left eye and the right eye, the brain synthesizes the images and creates a sense of viewing a real 3D object.

A user does not need to wear an auxiliary device when using an autostereoscopic 3D image display device. Therefore, restrictions for the user are less. However, a viewing position of the user is restricted when using the autostereoscopic 3D image display device. To overcome the limitation of the viewing position and expand a display angle of the autostereoscopic 3D image display device, tracking technology can be used in combination with dynamic adjustable spectroscopic devices (e.g., a lens array, a parallax barrier) to achieve a wider viewing angle. Such technology requires the spectroscopic device to be able to respond quickly and adjust in real-time based on the current position of the user, and the requirements for the hardware are high.

In addition, the tracking technology can also be used in combination with image processing technology to achieve a wider viewing angle. Such technology requires that display units on a display screen of the autostereoscopic 3D image display device can adjust gray values (also called intensity values) in real-time based on the current position of the user. However, in practical applications, the existing technologies require that the spectroscopic device cannot be adjusted continuously and the gray value of the display unit cannot be adjusted continuously when the user moves. Therefore, jitter may appear on the display.

The disclosed wide-angle autostereoscopic 3D image display methods, devices and systems are directed to solve one or more problems set forth above and other problems.

BRIEF SUMMARY OF THE DISCLOSURE

One aspect of the present disclosure includes a wide-angle autostereoscopic three-dimensional (3D) image display method. The method includes tracking a user in an autostereoscopic 3D image viewing state with respect to a display panel including a plurality of display units, obtaining a first distance between the display panel and a spectroscopic unit array including a plurality of spectroscopic units and a first width associated with each spectroscopic unit, and determining a second distance between a viewing position of the user and the display panel. The method also includes determining a width of a display unit combination corresponding to the second distance based on the first distance between the display panel and the spectroscopic unit array, the second distance between the viewing position of the user and the display panel, and the first width associated with each spectroscopic unit. Further, the method includes calculating a gray value of each display unit based on the width of the display unit combination and a reference value of the distance between each display unit and an edge of the display unit combination containing the display unit and displaying the 3D image on the display panel based on the obtained gray value of each display unit, wherein the gray value is a mixed value of gray values of pixels corresponding to coordinates of the display unit in at least two view images of a 3D image.

Another aspect of the present disclosure includes an autostereoscopic three-dimensional (3D) image displaying device. The device includes a tracking module configured to track a user in an autostereoscopic 3D viewing state with respect to a display panel including a plurality of display units, obtain a first distance between the display panel and a spectroscopic unit array including a plurality of spectroscopic units and a first width associated with each spectroscopic unit, and determine a second distance between a viewing position of the user and the display panel. The device also includes a determination module configured to, based on the first distance between the display panel and the spectroscopic unit array, the second distance between the viewing position of the user and the display panel, and the first width associated with each spectroscopic unit, determine a width of a display unit combination corresponding to the second distance and a calculation module configured to, based on the width of the display unit combination and a reference value of the distance between each display unit and an edge of the display unit combination containing the display unit, calculate a gray value of each display unit, wherein the gray value is a mixed value of gray values of pixels corresponding to coordinates of the display unit in at least two view images of a 3D image. Further, the system includes a display control module configured to, based on the obtained gray value of each display unit, display the 3D image on the display panel.

Another aspect of the present disclosure includes an autostereoscopic three-dimensional (3D) image displaying system. The system includes a tracking device configured to track a user in an autostereoscopic 3D viewing state with respect to a display panel including a plurality of display units, obtain a first distance between the display panel and a spectroscopic unit array including a plurality of spectroscopic units and a first width associated with each spectroscopic unit, and determine a second distance between a viewing position of the user and the display panel. The system also includes a memory configured to store program codes. Further, the system includes a processor configured to call the program codes stored in the memory and perform the following operations: controlling the tracking device to track the user in the autostereoscopic 3D viewing state with respect to the display panel, to obtain the first distance between the display panel and the spectroscopic unit array and the first width associated with each spectroscopic unit, and to determine the second distance between the viewing position of the user and the display panel; based on the first distance between the display panel and the spectroscopic unit array, the second distance between the viewing position of the user and the display panel, and the first width associated with each spectroscopic unit, determining the width of the display unit combination corresponding to the second distance; based on the width of the display unit combination and a reference value of the distance between each display unit and an edge of the display unit combination containing the display unit, calculating a gray value displayed by each display unit, wherein the gray value is a mixed value of gray values of pixels corresponding to coordinates of the display unit in at least two view images of a 3D image; and displaying the 3D image on the display panel based on the obtained gray value of each display unit.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be noted that some of the terms used in this application, such as "the first", "the second" are used to distinguish parameters with similar names, such that those skilled in the art can understand technical solutions of the present disclosure. Such terms are not intended to limit the present disclosure and, according to different applications, those terms can be changed or replaced.

An autostereoscopic three-dimensional (3D) image display device may include a display panel and a spectroscopic unit array. The autostereoscopic three-dimensional (3D) image display device is also called as a display device in the following description. The display panel may include a plurality of display units, and the spectroscopic unit array may include a plurality of spectroscopic units. The width of the spectroscopic unit is referred as a first width. A certain distance exists between a spectroscopic unit array and a display panel, and such distance is referred as a first distance.

Figure 8:
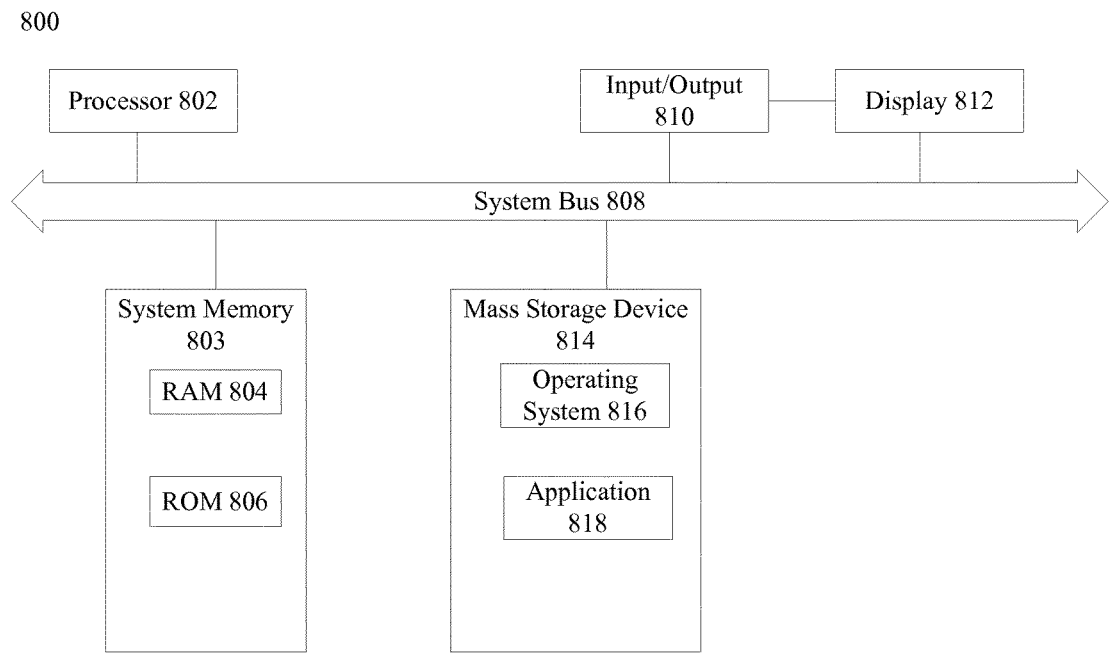
FIG. 8 illustrates a block diagram of a computing system implementing various modules of autostereoscopic 3D image display device.

FIG. 8 illustrates a block diagram of a computing system 800 implementing various modules of autostereoscopic three-dimensional (3D) image display device.

As shown in FIG. 8, computing system 800 may include a processor 802, a system memory 803, a system bus 808, an input/output unit 810, a display unit 812, and a mass storage device 814. System memory 803 includes a random access memory (RAM) unit 804, and a read-only memory (ROM) unit 806. Other components may be added and certain devices may be removed without departing from the principles of the disclosed embodiments.

Processor 802 may include any appropriate type of graphic processing unit (GPU), general purpose microprocessor, digital signal processor (DSP) or microcontroller, and application specific integrated circuit (ASIC). Processor 802 may execute sequences of computer program instructions to perform various processes associated with computing system 800. The computer program instructions may be loaded into RAM 804 for execution by processor 802 from read-only memory 806 or mass storage device 814.

Further, the processor 802 controls the tracking device 903 to track a user who is in an autostereoscopic 3D viewing state, and determine a second distance between a viewing position of the user and a display pane. Based on the first distance, the second distance and the first width, the processor 802 determines the width of a display unit combination corresponding to the second distance.

Based on the width of the display unit combination and a reference value of the distance between each display unit and the edge of the display unit combination containing the display unit, the processor 802 calculates a gray value displayed by each display unit in proper order, wherein the gray value is a mixed gray value of the pixels corresponding to the coordinates of the display unit in at least two view images of a 3D image. Based on the gray value of each display unit, the 3D image is displayed on the display panel.

System bus 808 may provide communication connections, such that computing system 800 may be accessed remotely and/or communicate with other systems via various communication protocols, such as transmission control protocol/internet protocol (TCP/IP), hypertext transfer protocol (HTTP), etc.

Input/output unit 810 may be provided for users to input information into computing system 800 or for the users to receive information from computing system 800. For example, input/output interface 810 may include any appropriate input device, such as a remote control, a keyboard, a mouse, an electronic tablet, voice communication devices, or any other optical or wireless input devices. Display unit 812 may include any appropriate display device such as a display module. Further, mass storage device 814 may include any appropriate type of mass storage medium to store operating system 816 and application 818, such as a CD-ROM, a hard disk, an optical storage, a DVD drive, or other type of storage devices.

During the operating process, 3D display system, or processor 802 of computing system 800 implementing the various modules of 3D display system, may perform certain processes to display 3D images to one or more users.

Figure 1:
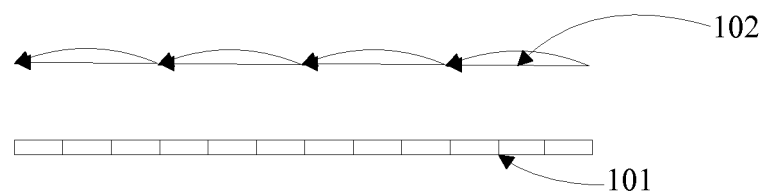
FIG. 1 illustrates a top view structure schematic diagram of an exemplary autostereoscopic three-dimensional (3D) image display device consistent with the disclosed embodiments.

FIG. 1 illustrates a top view structure schematic diagram of an exemplary autostereoscopic three-dimensional (3D) display device consistent with the disclosed embodiments. As shown in FIG. 1, the autostereoscopic 3D image display device may include at least one display panel 101 having a plurality of display units, and a spectroscopic unit array 102 having a lens array or a parallax barrier array, wherein the display panel 101 is covered by the spectroscopic unit array 102.

In general, the display panel 101 may be any appropriate type of display panel, such as plasma display panel (PDP) display, field emission display (FED), cathode ray tube (CRT) display, liquid crystal display (LCD), organic light emitting diode (OLED) display, light emitting diode (LED) display, or other types of displays. The spectroscopic unit array 102 may be a cylindrical lens grating, a liquid crystal lens grating or a parallax barrier grating (slit grating). The spectroscopic unit array 102 includes a plurality of spectroscopic units.

The display panel 101 includes a plurality of display units. The display unit is the unit on the display panel 101 that can independently control and display a certain gray value. For example, the display unit may be a pixel display unit, including a RGB (red, green or blue) pixel or a RGB sub-pixel. The spectroscopic unit array 102 can project lights emitted by a group of display units on the display panel 101 into different spatial positions. For the sake of simplicity, the cylindrical lens grating is used as the spectroscopic unit array 102 in this disclosure. Obviously, those skilled in the art can apply image processing techniques disclosed in the present disclosure into the autostereoscopic 3D image display device including the liquid crystal lens grating and the parallax barrier grating without the need of creative work, detailed of which are not repeated herein.

Figure 2:
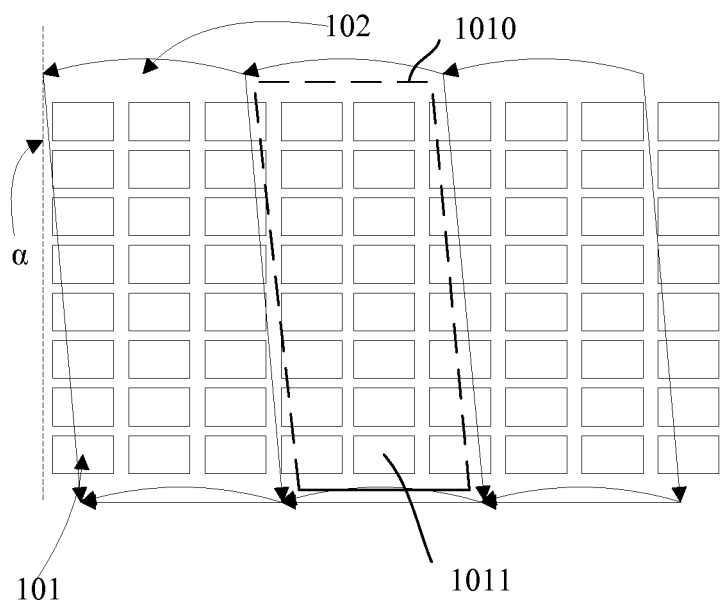
FIG. 2 illustrates a front view structure schematic diagram of an exemplary autostereoscopic 3D image display device consistent with the disclosed embodiments.

FIG. 2 illustrates a front view structure schematic diagram of an exemplary autostereoscopic 3D image display device consistent with the disclosed embodiments. As shown in FIG. 1 and FIG. 2, in a dynamic display and image arranging process, each spectroscopic unit corresponds to the m number of display units 1011, wherein m is an integer much greater than 1. The m number of display units 1011 corresponding to one spectroscopic unit includes a display unit combination 1010.

To reduce or eliminate Moire phenomenon, the spectroscopic unit 102 may be placed at an angle α with respect to the display unit combination 1010, i.e., between the axis direction of the spectroscopic unit 102 and the vertical direction of the spectroscopic unit. Optionally, the angle α may be referred as an acute angle formed between an extending direction along adjacent borders of the spectroscopic units 102 and a plane including the display unit combination 1010. Those skilled in the art should understand that, because configuration or selection of a reference starting point is different, a may also be an obtuse angle, or even may be zero.

In operation, when the user changes viewing positions, the autostereoscopic 3D image display device may perform a dynamic image arranging process to adjust the different viewing positions. During the image arranging process, a spectroscopic unit can map a plurality of display units into different display unit combinations 1010 according to different viewing positions of the user. The width of the spectroscopic unit is referred as a first width w1. The width of each display unit combination is referred as a second width w2. The second width w2 corresponds to a current viewing position of the user.

According to different categories of the spectroscopic unit arrays 102, the spectroscopic unit array 102 may be attached to a surface of the display panel 101, and the spectroscopic unit array 102 may also be disposed between a backlight module and the display panel 101. For example, the lens grating type spectroscopic unit arrays 102 is usually placed on the surface of the display panel 101; whereas, the barrier grating spectroscopic unit arrays 102 is disposed between the backlight module and the display panel 101. A certain distance exists between the spectroscopic unit array 102 and the display panel 101, and such distance is referred as a first distance f.

A distance between the viewing position of the user and the display panel 101 is referred as a second distance z. The second distance z can be obtained by using any appropriate tracking technology. The second distance z is usually referred as the distance between the center of two eyes of the user and the display panel 101.

The display panel 101 may display a stereoscopic image having a certain gray value. The spectroscopic unit array 102 may project the stereoscopic image into the user's left eye and the user's right eye, such that the user's brain can synthesize the stereoscopic image. In the present disclosure, the display device may be connected to a tracking device, and the tracking device can track the position of the user through image acquisition, infrared tracking, or ultrasound acquisition. For example, the tracking device may be a camera, an infrared ray (IR) receiver, an ultrasonic transmitter/receiver. The tracking device may be configured outside or inside the display device and, based on a tracking result of the tracking device, the display device can determine in real-time the position of the user viewing the autostereoscopic display and, further, the second distance z and coordinates of user control.

Figure 3:
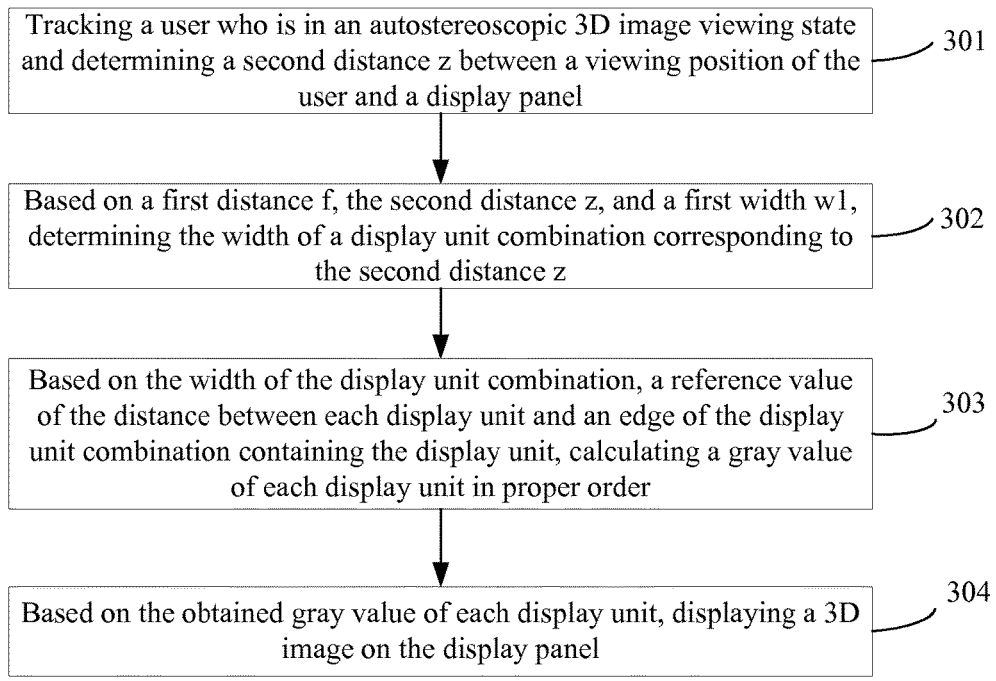
FIG. 3 illustrates a flow chart of an exemplary wide-angle autostereoscopic 3D image display process consistent with the disclosed embodiments.

Based on the above autostereoscopic 3D image display device, a wide-angle autostereoscopic 3D image display process can be provided. FIG. 3 illustrates a flow chart of an exemplary wide-angle autostereoscopic 3D image display process consistent with the disclosed embodiments. As shown in FIG. 3, the display process may include the following steps.

Step 301: a user who is in an autostereoscopic 3D image viewing state with respect to a display panel 101 including a plurality of display units is tracked, and a second distance z between a viewing position of the user and the display panel 101 is determined.

In this step, the display device may track the user using any appropriate tracking technology. Based on a tracking result, the second distance z between the viewing position of the user and the display panel 101 is determined, such as, a distance between the center of the user's two eyes and the display panel 102.

Step 302: based on the first distance f, the second distance z, and the first width w1 associated with each spectroscopic unit, a width of a display unit combination corresponding to the second distance z is determined.

Figure 5:
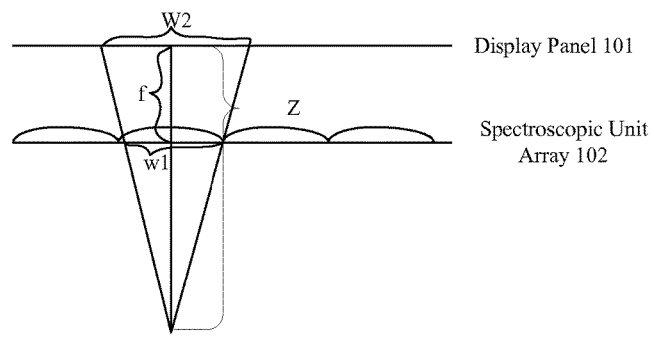
FIG. 5 illustrates a schematic diagram for calculating a width of a display unit combination consistent with the disclosed embodiments.

In this step, based on the first distance f, the second distance z and the first width w1, and in combination with certain principles of optics, the display device can calculate the second width w2 associated with the display unit combination. FIG. 5 illustrates a schematic diagram for calculating a width of a display unit combination consistent with the disclosed embodiments.

As shown in FIG. 5, the width of the display unit combination is defined by:

$$\frac{z-f}{w1} = \frac{z}{w2} \quad (1)$$

wherein z represents the second distance between a viewing position of the user and a display panel 101 including a plurality of display units; w1 represents the first width associated with each spectroscopic unit; w2 represents the second width associated with the display unit combination; and f represents the first distance.

Therefore, w2=z*w1/(z−f). That is, the second width w2 is obtained by dividing a product of the second distance z and the first width w1 by a difference between the second distance z and the first distance f. The second width w2 corresponds to a current viewing position of the user. Because the first distance f is much smaller than the second distance z, the first width w1 is slightly smaller than the second width w2.

The autostereoscopic 3D image display devices may include multi-view autostereoscopic 3D image display devices and dual-view autostereoscopic 3D image display devices. The multi-view autostereoscopic 3D image display device may construct a 3D image through multiple views, and the dual-view autostereoscopic 3D image display device may construct a 3D image through two views. There is a parallax between the views (or view images) in the multi-view or the dual-view display device.

Returning to FIG. 3, after the second width w2 is obtained, based on the second width w2 and other parameters, the contents of the dual-view or multi-view images need to be mapped to gray values of the display units.

To facilitate the mapping operation, a coordinate system of the display unit array may be established. The coordinate system may have different origins and different coordinate axis directions. In general, the coordinate system sets the top-left corner of the display panel 101 as an origin, and each display unit has its coordinates (xn, yn). Accordingly, the size of each view image generally corresponds to the size of the display panel 101 or the display window, and each view image contains a plurality of pixels. Among the plurality of pixels, there is a pixel that has the same coordinates as the display unit (xn, yn), and the gray value of this pixel is c. Therefore, when n (n≥2) number of views are named as v0, v1, v2 . . . vn−1, the gray value of the pixel that has the same coordinates as the display unit (xn, yn) in each view image can be named as c0, c1, c2 . . . cn−1.

Step 303: based on the width of the display unit combination and a reference value of a distance between each display unit and an edge of the display unit combination containing the display unit, the gray value displayed by each display unit is calculated in proper order, wherein the gray value is a mixed value of the gray values of the pixels corresponding to coordinates of the display unit in at least two view images of the 3D image.

In this step, the display device calculates the gray value displayed by each display unit based on the second width w2 and the reference value of the distance between each display unit and the edge of the display unit combination containing the display unit. The gray value displayed by each display unit may be different in different embodiments. For example, if the user does not move, when the gray value of each display unit is calculated, an offset value of the user between an initial state and a current state in a horizontal direction does not need to be considered. At this time, the reference value of the distance between each display unit and the edge of the display unit combination containing the display unit is a sum of the distance tn between each display unit and the edge of the display unit combination containing the display unit and a compensation value offset. That is, the reference value=tn+offset.

The compensation value offset may be the offset value of the spectroscopic unit array 102 relative to the edge of the display panel 101 on a horizontal line of the display panel 101, that is, the offset value when the position of the user relative to the display panel 101 does not have a horizontal offset. The offset value is usually formed due to errors in a process for assembling the spectroscopic unit array 102 and the display unit array. Therefore, after the compensation value offset is added, the user may have a desired 3D viewing effect when the user is in the middle of the display panel 101.

However, when the user moves in the horizontal direction, the display device tracks the user who is in the autostereoscopic 3D image viewing state and determines coordinates (x, y, z) of the viewing position of the user. Also, based on the coordinates (x, y, z) of the viewing position of the user, the first angle α, and the second distance z, the display device determines the offset value offd of the user in the horizontal direction. The offset value offd is defined by:

$$\text{offd}=(x+y/\tan α)/z \quad (2)$$

In general, a reference value t of the distance between each display unit and the edge of the display unit combination is the sum of the distance tn between each display unit and the edge of the display unit combination containing the display unit, the compensation value offset, and the offset value offd of the user in the horizontal direction, that is, t=tn+offset+offd.

In this step, based on the reference value t and the second width w2, the display device determines the mixed value of the gray values of the pixels corresponding to the coordinates of the display unit in the at least two view images of the 3D image. The mixed value of the gray values is used as the gray value of each display unit.

Step 304: based on the obtained gray value of each display unit, the 3D image is displayed on the display panel 101.

In Step 304, after the gray value of each display unit is obtained in the proper order, a display control circuit (i.e., a driving circuit) generates a driving voltage, such that each display unit can display its gray value independently to form the 3D image.

Because the gray value of each display unit is obtained based on the user position obtained through real-time tracking, even if the user moves from left to right or moves back and forth, the display unit can still display the appropriate gray value. Based on the obtained gray value of each display unit, the 3D image is displayed on the display panel 101. Thus, a desired 3D display effect can be obtained and jitter can be reduced. Therefore, a wide-angle autostereoscopic 3D viewing effect is realized.

Figure 4:
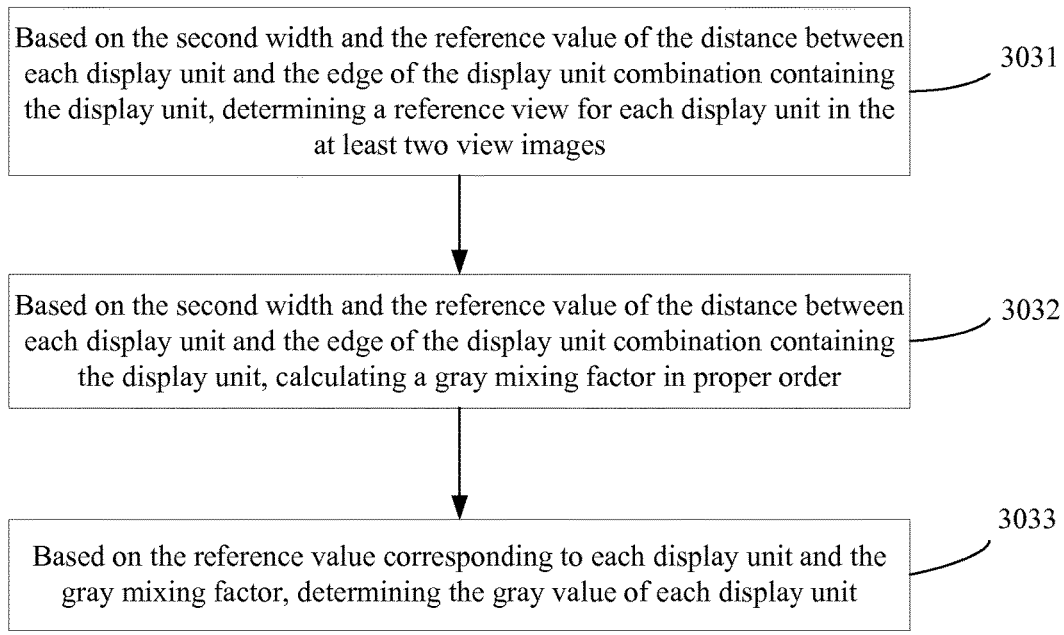
FIG. 4 illustrates a flow chart of an exemplary process for calculating a gray value of a display unit in a wide-angle autostereoscopic 3D image display process consistent with the disclosed embodiments.

FIG. 4 illustrates a flow chart of an exemplary process for calculating a gray value of a display unit in a wide-angle autostereoscopic 3D image display process consistent with the disclosed embodiments. As shown in FIG. 4, Step 303 in FIG. 3 may further include the following steps.

Step 3031: based on the width of the display unit combination and the reference value of the distance between each display unit and the edge of the display unit combination containing the display unit, a reference view is determined for each display unit in the at least two view images.

In this step, the display device obtains a product by multiplying a ratio of the reference value t of the distance between each display unit and the edge of the display unit combination containing the display unit to the second width w2 by the number of the view images, and rounds the product down to a nearest whole number. The view image corresponding to the whole number is then used as the reference view. The gray value of the pixel corresponding to the coordinates of the display unit in the reference view is the reference gray value of the display unit.

Figure 6:
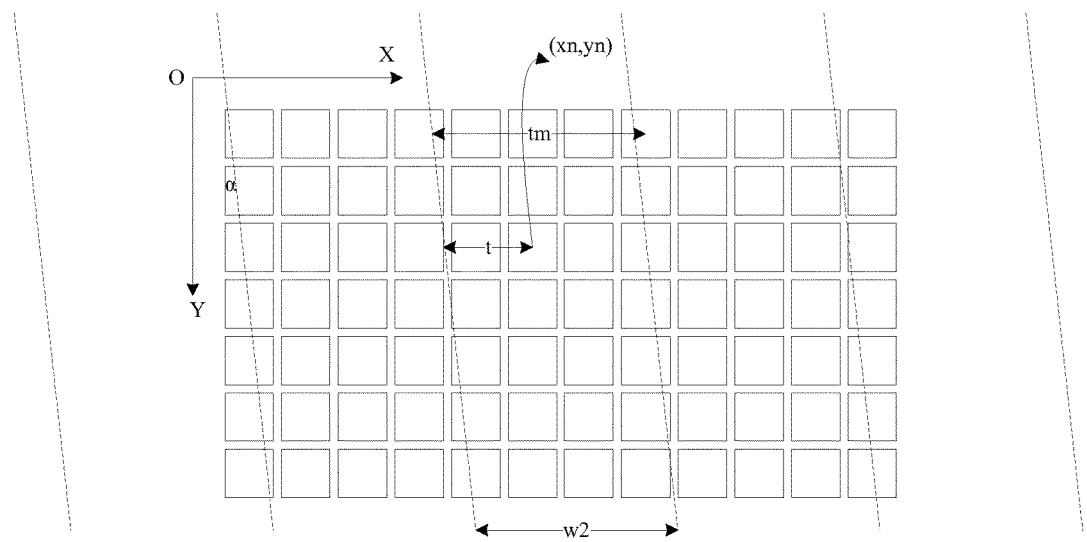
FIG. 6 illustrates a schematic diagram of an exemplary arrangement of display units consistent with the disclosed embodiments.

For example, in a dual-view embodiment, two views having a parallax are v0 and v1, respectively. Contents of two views v0 and v1 are mapped to the gray value of the display unit. FIG. 6 illustrates a state diagram of one arrangement of display units consistent with the disclosed embodiments. As shown in FIG. 6, the gray value for the display unit with coordinates (xn, yn) is a mixing result of the gray values corresponding to the corresponding coordinates of v0 and v1.

According to the previous embodiment, $$\frac{z-f}{w1} = \frac{z}{w2}$$

can be used to calculate the width w2 associated with a display unit combination. Each group of display units that may be placed at an angle α in a vertical direction with respect to the spectroscopic unit can form a plurality of combinations G, and the width of each combination G is the second width w2.

When the user does not move, the distance between the display unit with coordinates (xn, yn) and the edge (right side or left side) of the display unit combination containing the display unit is t. The reference view can be determined by INT(t*2/w2), wherein INT(t*2/w2) represents that t*2/w2 is rounded down to the whole number. When INT(t*2/w2) is 0, it indicates that v0 view is the reference view. When INT(t*2/w2) is 1, it indicates that v1 view is the reference view.

Step 3032: based on the width of the display unit combination and the reference value of the distance between each display unit and the edge of the display unit combination containing the display unit, a gray mixing factor is calculated in proper order, wherein the gray mixing factor is a mixing factor of the gray values of the at least two view images in the gray value of each display unit.

In this step, a floating-point value of the product obtained by multiplying the ratio of the reference value t of the distance between each display unit and the edge of the display unit combination containing the display unit to the second width w2 by the number of the view images is obtained. The view image corresponding to the floating-point value is used as the gray mixing factor h.

In the dual-view embodiment, to calculate the gray mixing factor h of the gray values of the display units, the formula FLOAT(t*2/w2) can be used. FLOAT(t*2/w2) represents to obtain a floating-point value for t*2/w2, wherein 2 is the number of views. Similarly, when the number of views is n, the gray mixing factor h may be calculated by:

$$h = FLOAT(t*n/w2) \qquad (3)$$

Step 3033: based on the reference value corresponding to each display unit and the mixing factor, the gray value of each display unit is determined.

In this step, the gray value of each display unit is determined by:

$$c = (1-h)*c0 + h*c1 \qquad (4)$$

where c represents the gray value of each display unit; h represents the gray mixing factor; c0 represents the reference value of the gray value; and c1 represents the gray value of the pixel corresponding to each display unit in a non-reference view between the at least two view images.

In the dual-view embodiment, after the display device determines the reference view through calculation, the gray value of the pixel corresponding to the display unit with coordinates (xn, yn) in the reference view is set as the reference value $c_b$. For example, when the view v0 is determined as the reference view through INT(t*2/w2), the gray value c0 of the pixel corresponding to the display unit with coordinates (xn, yn) in the view v0 is set as the reference value $c_b$. The final gray value of the display unit with coordinates (xn, yn) is c=(1−h)*c0+h*c1.

By performing the above process, the display device can calculate the gray value of each display unit, thus completing the setting of the gray value. Then, the gray value of each display unit is set to the calculated gray value. The driving circuit generates the driving voltage, such that each display unit can display the obtained gray value independently to form the 3D image on the display panel 101. Thus, the wide-angle autostereoscopic 3D viewing effect of the dual-view is realized when the user does not move in the horizontal direction.

In above embodiments, the dual-view 3D display is used as an example. When the multi-view is used (that is, n is greater than 2), the reference view in the multi-view can be determined by the formula INT(t*n/w2). Accordingly, the gray mixing factor is h=FLOAT(t*n/w2).

For example, during performing a four-view process, after v2 is determined as the reference view through the formula INT(t*n/w2) and the gray mixing factor is h=FLOAT(t*4/w2), the gray value of the display unit is c=(1−h)*c2+h*c3, wherein c1, c2, and c3 are the gray values of the pixels corresponding to the display unit (xn, yn) in the view v1, view v2, and view v3, respectively.

Specifically, at the beginning, the display device obtains a product by multiplying a ratio of the reference value t of the distance between each display unit and the edge of the display unit combination containing the display unit to the second width w2 by the number of the view images, and rounds the product down to a nearest whole number. Thus, the display device determines the reference view through rounding the product down to the whole number. After the display device determines the reference view, the reference view and a next view following the reference view are usually used to determine color extraction. At last, the color extraction ratio of the two views (i.e., the reference view and a next view following the reference view) is determined through the gray mixing factor.

By performing the above process, the display device can calculate the gray value of each display unit, thus completing the setting of the gray value. Then, the gray value of each display unit is set to the calculated gray value. The driving circuit generates the driving voltage, such that each display unit can display the obtained gray value independently to form the 3D image on the display panel 101. Thus, the wide-angle autostereoscopic 3D viewing effect of the multi-view is realized when the user does not move in the horizontal direction.

In the above embodiments, it is assumed that the user does not move in the horizontal direction, and there is no assembly error when the spectroscopic device and the display unit array are assembled. However, in practical applications, the user may move in the horizontal direction during the viewing process, and/or the spectroscopic device and the display unit array may generate an offset error in the assembly process.

In one embodiment that considers the assembly error, t is deformed to tn+offset, wherein tn is the distance between each display unit and the edge of the display unit combination containing the display unit when no error exists and the user does not move in the horizontal direction, offset is a compensation value and offset can be the assembly error in the horizontal direction when the spectroscopic unit array 102 and the display unit array are assembled.

Thus, the wide-angle autostereoscopic 3D viewing effect using the dual-view and the multi-view can be realized when the user does not move in the horizontal direction and the assembly error is compensated.

In another embodiment, when a user who is in a moving state views a 3D image, t is deformed to tn+offset+offd, wherein offd represents a variable that can be adjusted in real-time based on the user's position in the horizontal direction and is used as the offset value of the user in the horizontal direction. The position of the user obtained by a tracking device is (x, y, z). Then, w2=z*w1/(z−f) and offd=(x+y/tan α)/z are calculated in real-time. After t is replaced by tn+offset+offd, the gray value of each display unit when the user is in the moving state can be obtained. Thus, the 3D display effect can be adjusted in real-time according to the viewing position of the user. Therefore, the user has a desired 3D viewing experience in a wide range.

In the above embodiments, the wide-angle autostereoscopic 3D viewing effect using the dual-view and the multi-view application can be realized when the user moves in the horizontal direction and the assembly error is compensated.

Figure 7:
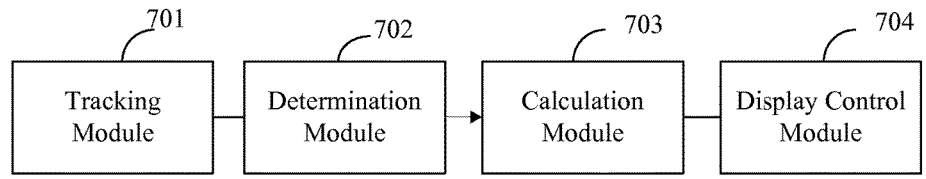
FIG. 7 illustrates a structure schematic diagram of an exemplary autostereoscopic 3D image display device consistent with the disclosed embodiments.

FIG. 7 illustrates a structure schematic diagram of an exemplary autostereoscopic 3D image display device consistent with the disclosed embodiments. The display device may include a display panel 101 and a spectroscopic unit array 102. The display panel 101 may include a plurality of display units, and the spectroscopic unit array 102 may include a plurality of spectroscopic units. The spectroscopic unit array 102 is set at a position having a first distance from the display panel 101. The display panel 101 and the spectroscopic unit are placed at a first angle in the vertical direction. Each spectroscopic unit may, based on different viewing positions of the user, map multiple display units into a display unit combination. Each spectroscopic unit has a first width. As shown in FIG. 7, the display device may further include a tracking module 701, a determination module 702, a calculation module 703, and a display control module 704.

The tracking module 701 may be configured to track a user in an autostereoscopic 3D viewing state with respect to a display panel 101, obtain a first distance between the display panel and a spectroscopic unit array including a plurality of spectroscopic units and a first width associated with each spectroscopic unit, and determine a second distance between the viewing position of the user and the display panel 101.

The width of the spectroscopic unit is referred as a first width. The width of each display unit combination is referred as a second width w2. A certain distance exists between a spectroscopic unit array and a display panel, and such distance is referred as a first distance.

The determination module 702 may be configured to, based on the first distance between the display panel 101 and the spectroscopic unit array 102, the second distance between the viewing position of the user and the display panel 101, and the first width associated with each spectroscopic unit, determine a width of a display unit combination corresponding to the second distance.

The calculation module 703 may be configured to, based on the width of the display unit combination and a reference value of the distance between each display unit and an edge of the display unit combination containing the display unit, calculate a gray value of each display unit, wherein the gray value is a mixed value of gray values of pixels corresponding to coordinates of the display unit in at least two view images of a 3D image.

The display control module 704 may be configured to, based on the obtained gray value of each display unit, display the 3D image on the display panel 101.

Optionally, the calculation module 703 may further include a reference view determination unit, a mixing factor determination unit, and a gray value determination unit.

The reference view determination unit may be configured to, based on the width of the display unit combination and the reference value of the distance between each display unit and the edge of the display unit combination containing the display unit, determine a reference view for each display unit in at least two view images, wherein the gray value of the pixel corresponding to the coordinates of each display unit in the reference view is a reference value of the gray value of the display unit.

The mixing factor determination unit may be configured to, based on the width of the display unit combination and the reference value of the distance between each display unit and the edge of the display unit combination containing the display unit, calculate a gray mixing factor, wherein the gray mixing factor is a mixing factor of the gray values of the at least two view images in the gray value of each display unit.

The gray value determination unit may be configured to, based on the reference value corresponding to each display unit and the gray mixing factor, determine the gray value of each display unit.

Specifically, the reference view determination unit may obtain a product by multiplying a ratio of the reference value of the distance between each display unit and the edge of the display unit combination containing the display unit to the width of the display unit combination by the number of the view images, round the product down to a nearest whole number, and use the view image corresponding to the whole number as the reference view.

Specifically, the mixing factor determination unit may obtain a floating-point value of the product obtained by multiplying the ratio of the reference value of the distance between each display unit and the edge of the display unit combination containing the display unit to the width of the display unit combination by the number of the view images, and use the view image corresponding to the floating-point value as the gray mixing factor of the reference view and the non-reference view.

Specifically, the gray value determination unit may determine the gray value of each display unit by:

$$c=(1-h)*c0+h*c1 \qquad (4)$$

wherein c represents the gray value of each display unit; h represents the gray mixing factor; c0 represents the reference value of the gray value; and c1 represents the gray value of the pixel corresponding to each display unit in a non-reference view in the at least two view images.

Optionally, the determination module may be configured to obtain the second width by dividing a product of the second distance and the first width by the difference between the second distance and the first distance.

Optionally, the reference value of the distance between each display unit and the edge of the display unit combination containing the display unit is the sum of the distance between each display unit and the edge of the display unit combination containing the display unit and the offset.

Optionally, the display device may further include a coordinate determination module and an offset determination module.

The coordinate determination module may be configured to track the user who is in the autostereoscopic 3D viewing state and determinate the coordinates of the viewing position of the user.

The offset determination module may be configured to, based on the coordinates of the viewing position of the user, the first angle and the second distance between a viewing position of the user and the display panel, determine the offset of the user in the horizontal direction.

The reference value of the distance between each display unit and the edge of the display unit combination containing the display unit is the sum of the distance between each display unit and the edge of the display unit combination containing the display unit, the compensation value, and the offset of the user in the horizontal direction.

Further, the offset determination module may determine the offset value offd of the user in the horizontal direction using the following formula:

$$\text{offd} = (x + y/\tan \alpha)/z, \quad (2)$$

wherein x is a longitudinal coordinate of the user's viewing position; y is a transverse coordinate of the user's viewing position; z is the second distance between a viewing position of the user and the display panel, a is the first angle between the display panel and the spectroscopic unit in the vertical direction; and offd is the offset value of the user in the horizontal direction.

The above embodiment provides the corresponding modules in related with the process shown in FIG. 3. Detailed descriptions can refer to the previous embodiments, which are not repeated herein.

By using the display device shown in FIG. 7, the distance between the viewing position of the user and the position of the display panel 101 of the display device can be determined in real-time through any appropriate tracking technology. Based on the tracking result in combination with the optical parameters of the display device, the first distance between the display panel and the spectroscopic unit array, the second distance between the viewing position of the user and the display panel, and the first width associated with each spectroscopic unit, the width of the display unit combination corresponding to the second distance can be determined, and the gray value displayed by each display unit can be calculated. Based on the obtained gray value of each display unit, the 3D image is displayed on the display panel 101. Also, the gray value of each display unit is the mixed gray value of the pixels corresponding to the coordinates of the display unit in at least two view images of the 3D image. By using this method, the viewing angle can be effectively expanded, and the gray value of the display unit can be continuously adjusted in real-time. Thus, a smooth display effect is realized, and jitter can be reduced.

Figure 9:
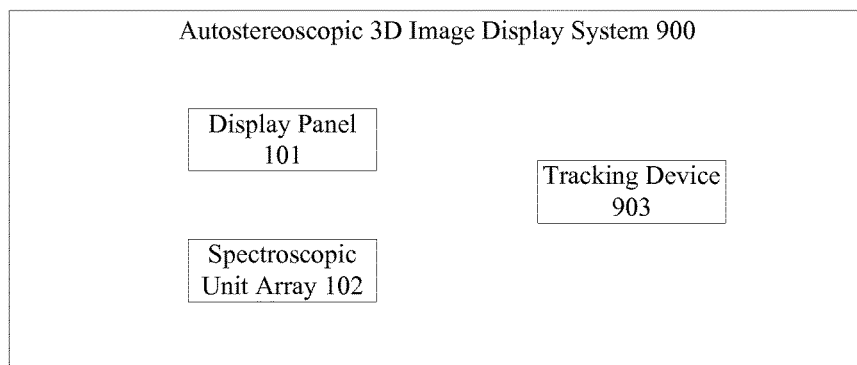
FIG. 9 illustrates a structure schematic diagram of an exemplary autostereoscopic 3D image display system consistent with the disclosed embodiments.

FIG. 9 illustrates a structure schematic diagram of an exemplary autostereoscopic 3D image display system 900 consistent with the disclosed embodiments. As shown in FIG. 9, the system may include a display panel 101, a spectroscopic unit array 102, and a tracking device 903. Other components may be added and certain devices may be removed without departing from the principles of the disclosed embodiments.

The display panel 101 may include a plurality of display units, and the spectroscopic unit array 102 may include a plurality of spectroscopic units. The display panel 101 may be any appropriate type of display panel, such as plasma display panel (PDP) display, field emission display (FED), cathode ray tube (CRT) display, liquid crystal display (LCD), organic light emitting diode (OLED) display, light emitting diode (LED) display, or other types of displays. The spectroscopic unit array 102 may be a cylindrical lens grating, a liquid crystal lens grating or a parallax barrier grating (slit grating).

The spectroscopic unit array 102 is set at a position having a first distance from the display panel 101. The display panel 101 and the spectroscopic unit array 102 are placed at a first angle in the vertical direction. Each spectroscopic unit may, based on different viewing positions of a user, map multiple display units into a display unit combination. Each spectroscopic unit has a first width.

The tracking device 903 can track the position of the user through image acquisition, infrared tracking, or ultrasound acquisition. The tracking device 903 may be a camera, an infrared ray (IR) receiver, an ultrasonic transmitter/receiver, and so on.

By using the display system shown in FIG. 9, a distance between a viewing position of the user and a position of the display panel 101 of the display system 900 can be determined in real-time through any appropriate tracking technology. Based on the tracking result in combination with optical parameters of the display system 900, the first distance between the display panel and the spectroscopic unit array, the second distance between the viewing position of the user and the display panel, and the first width associated with each spectroscopic unit, the width of the display unit combination corresponding to the second distance can be determined, and a gray value displayed by each display unit can be calculated. Based on the obtained gray value of each display unit, a 3D image is displayed on the display panel 101. Also, the gray value of each display unit is the mixed gray value of pixels corresponding to coordinates of the display unit in at least two view images of the 3D image. By using this system, the viewing angle can be effectively expanded, and the gray value of the display unit can be continuously adjusted in real-time. Thus, a smooth display effect is realized and jitter can be reduced.

Those of skill would further appreciate that the various illustrative modules and algorithm steps described in connection with the embodiments disclosed herein may be implemented as electronic hardware, computer software, or combinations of both. To clearly illustrate this interchangeability of hardware and software, various illustrative modules and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wide-angle autostereoscopic three-dimensional (3D) image display method, comprising:
    tracking a user in an autostereoscopic 3D image viewing state with respect to a display panel including a plurality of display units;
    obtaining a first distance between the display panel and a spectroscopic unit array including a plurality of spectroscopic units and a first width associated with each spectroscopic unit;
    determining a second distance between a viewing position of the user and the display panel;
    based on the first distance between the display panel and the spectroscopic unit array, the second distance between the viewing position of the user and the display panel, and the first width associated with each spectroscopic unit, determining a width of a display unit combination corresponding to the second distance;
    based on the width of the display unit combination and a reference value of the distance between each display unit and an edge of the display unit combination containing the display unit, calculating a gray value of each display unit, wherein the gray value is a mixed value of gray values of pixels corresponding to coordinates of the display unit in at least two view images of a 3D image; and
    based on the obtained gray value of each display unit, displaying the 3D image on the display panel.

2. The method according to claim 1, wherein calculating a gray value of each display unit further includes:
    based on the width of the display unit combination and the reference value of the distance between each display unit and the edge of the display unit combination containing the display unit, determining a reference view for each display unit in the at least two view images;
    based on the reference view for each display unit, obtaining a reference value of the gray value of each display unit, wherein the reference value of the gray value of each display unit is the gray value of the pixel corresponding to coordinates of each display unit in the reference view;
    based on the width of the display unit combination and the reference value of the distance between each display unit and the edge of the display unit combination containing the display unit, calculating a gray mixing factor, wherein the gray mixing factor is a mixing factor of the gray values of the at least two view images in the gray value of each display unit; and
    based on the reference value corresponding to each display unit and the gray mixing factor, determining the gray value of each display unit.

3. The method according to claim 2, wherein determining a reference view for each display unit in the at least two view images further includes:
    obtaining a product by multiplying a ratio of the reference value of the distance between each display unit and the edge of the display unit combination containing the display unit to the width of the display unit combination by a total number of the view images;
    rounding the product down to a nearest whole number; and
    using the view image corresponding to the whole number as the reference view.

4. The method according to claim 2, wherein calculating a gray mixing factor further includes:
    obtaining a floating-point value of the product obtained by multiplying the ratio of the reference value of the distance between each display unit and the edge of the display unit combination containing the display unit to the width of the display unit combination by the total number of the view images; and
    using the view image corresponding to the floating-point value as the gray mixing factor of the reference view and a non-reference view.

5. The method according to claim 2, wherein:
    the gray value c of each display unit is determined by:

$$c=(1-h)*c0+h*c1$$

wherein h represents a mixing gray factor; c0 represents a reference value of the gray value; and c1 represents a gray value of a pixel corresponding to each display unit in a non-reference view in the at least two view images.

6. The method according to claim 1, wherein:
    the width w2 of the display unit combination is defined by:

$$w2=z*w1/(z-f)$$

wherein z represents the second distance between the viewing position of the user and the display panel; w1 represents the first width associated with each spectroscopic unit; and f represents the first distance between the display panel and the spectroscopic unit array.

7. The method according to claim 6, wherein:
    the reference value of the distance between each display unit and the edge of the display unit combination containing the display unit is a sum of the distance between each display unit and the edge of the display unit combination containing the display unit and a compensation value.

8. The method according to claim 6, further including:
    tracking the user in the autostereoscopic 3D image viewing state with respect to the display panel;
    determining coordinates of the viewing position of the user;
    based on the coordinates of the viewing position of the user, a first angle between the display panel and the spectroscopic unit in a vertical direction, and the second distance between the viewing position of the user and the display panel, determining an offset value of the user in a horizontal direction; and
    calculating the reference value of the distance between each display unit and the edge of the display unit combination by adding the distance between each display unit and the edge of the display unit combination, the compensation value, and the offset value of the user in the horizontal direction.

9. The method according to claim 8, wherein:
the offset value offd of the user in the horizontal direction is determined by:

$$\text{offd} = (x + y/\tan \alpha)/z,$$

wherein x is a longitudinal coordinate of the user's viewing position; y is a transverse coordinate of the user's viewing position; z is the second distance; and α is the first angle between the display panel and the spectroscopic unit in a vertical direction.

10. The method according to claim 1, wherein:
a parallax exists between the at least two view images.

11. An autostereoscopic three-dimensional (3D) image displaying device, comprising:
a tracking module configured to:
track a user in an autostereoscopic 3D viewing state with respect to a display panel including a plurality of display units;
obtain a first distance between the display panel and a spectroscopic unit array including a plurality of spectroscopic units and a first width associated with each spectroscopic unit; and
determine a second distance between a viewing position of the user and the display panel;
a determination module configured to, based on the first distance between the display panel and the spectroscopic unit array, the second distance between the viewing position of the user and the display panel, and the first width associated with each spectroscopic unit, determine a width of a display unit combination corresponding to the second distance;
a calculation module configured to, based on the width of the display unit combination and a reference value of the distance between each display unit and an edge of the display unit combination containing the display unit, calculate a gray value of each display unit, wherein the gray value is a mixed value of gray values of pixels corresponding to coordinates of the display unit in at least two view images of a 3D image; and
a display control module configured to, based on the obtained gray value of each display unit, display the 3D image on the display panel.

12. The device according to claim 11, wherein the calculation module further includes:
a reference view determination unit configured to:
based on the width of the display unit combination and the reference value of the distance between each display unit and the edge of the display unit combination containing the display unit, determine a reference view for each display unit in the at least two view images; and
based on the reference view for each display unit, obtain a reference value of the gray value of each display unit, wherein the reference value of the gray value of each display unit is the gray value of the pixel corresponding to coordinates of each display unit in the reference view;
a mixing factor determination unit configured to, based on the width of the display unit combination and the reference value of the distance between each display unit and the edge of the display unit combination containing the display unit, calculate a gray mixing factor, wherein the gray mixing factor is a mixing factor of the gray values of the at least two view images in the gray value of each display unit; and
a gray value determination unit configured to, based on the reference value corresponding to each display unit and the gray mixing factor, determine the gray value of each display unit.

13. The device according to claim 12, wherein the reference view determination unit is further configured to:
obtain a product by multiplying a ratio of the reference value of the distance between each display unit and the edge of the display unit combination containing the display unit to the width of the display unit combination by a total number of the view images;
round the product down to a nearest whole number; and
use the view image corresponding to the whole number as the reference view.

14. The device according to claim 12, wherein the mixing factor determination unit is further configured to:
obtain a floating-point value of the product obtained by multiplying the ratio of the reference value of the distance between each display unit and the edge of the display unit combination containing the display unit to the width of the display unit combination by the total number of the view images; and
use the view image corresponding to the floating-point value as the gray mixing factor of the reference view and a non-reference view in the at least two view images.

15. The device according to claim 12, wherein:
the gray value c of each display unit is determined by:

$$c = (1-h)*c0 + h*c1$$

wherein h represents a gray mixing factor; c0 represents a reference value of the gray value; and c1 represents a gray value of a pixel corresponding to each display unit in the non-reference view in the at least two view images.

16. The device according to claim 11, wherein:
the width w2 of the display unit combination is defined by:

$$w2 = z*w1/(z-f)$$

wherein z represents the second distance between the viewing position of the user and the display panel; w1 represents the first width associated with each spectroscopic unit; and f represents the first distance between the display panel and the spectroscopic unit array.

17. The device according to claim 16, wherein:
the reference value of the distance between each display unit and the edge of the display unit combination containing the display unit is a sum of the distance between each display unit and the edge of the display unit combination containing the display unit and a compensation value.

18. The device according to claim 11, further including:
a coordinate determination module configured to track the user in the autostereoscopic 3D viewing state and determinate the coordinates of the viewing position of the user; and
an offset determination module configured to, based on the coordinates of the viewing position of the user, a first angle between the display panel and the spectroscopic unit in a vertical direction, and the second distance between the viewing position of the user and the display panel, determine an offset value of the user in a horizontal direction.

19. The device according to claim 18, wherein:
the offset value offd of the user in the horizontal direction is determined by:

$$offd(x+y/\tan \alpha)/z,$$

wherein x is a longitudinal coordinate of the user's viewing position; y is a transverse coordinate of the user's viewing position; z is the second distance between the viewing position of the user and the display panel; and $\alpha$ is the first angle between the display panel and the spectroscopic unit in a vertical direction.

20. An autostereoscopic three-dimensional (3D) image displaying system, comprising:
- a tracking device configured to:
  - track a user in an autostereoscopic 3D viewing state with respect to a display panel including a plurality of display units;
  - obtain a first distance between the display panel and a spectroscopic unit array including a plurality of spectroscopic units and a first width associated with each spectroscopic unit; and
  - determine a second distance between a viewing position of the user and the display panel;
- a memory configured to store program codes; and
- a processor configured to call the program codes stored in the memory and perform the following operations:
  - controlling the tracking device to track the user in the autostereoscopic 3D viewing state with respect to the display panel, to obtain the first distance between the display panel and the spectroscopic unit array and the first width associated with each spectroscopic unit, and to determine the second distance between the viewing position of the user and the display panel;
  - based on the first distance between the display panel and the spectroscopic unit array, the second distance between the viewing position of the user and the display panel, and the first width associated with each spectroscopic unit, determining the width of the display unit combination corresponding to the second distance;
  - based on the width of the display unit combination and a reference value of the distance between each display unit and an edge of the display unit combination containing the display unit, calculating a gray value displayed by each display unit, wherein the gray value is a mixed value of gray values of pixels corresponding to coordinates of the display unit in at least two view images of a 3D image; and
  - based on the obtained gray value of each display unit, displaying the 3D image on the display panel.

* * * * *